United States Patent
Chang

(10) Patent No.: US 12,555,349 B2
(45) Date of Patent: Feb. 17, 2026

(54) IMAGE PROCESSING APPARATUS AND IMAGE PROCESSING METHOD

(71) Applicant: Wistron Corporation, New Taipei (TW)

(72) Inventor: Tzu-Peng Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 458 days.

(21) Appl. No.: 18/162,722

(22) Filed: Feb. 1, 2023

(65) Prior Publication Data

US 2024/0135670 A1 Apr. 25, 2024
US 2024/0233316 A9 Jul. 11, 2024

(30) Foreign Application Priority Data

Oct. 20, 2022 (TW) .................................. 111139780

(51) Int. Cl.
*G06V 10/60* (2022.01)
*G06T 7/194* (2017.01)
(Continued)

(52) U.S. Cl.
CPC .............. *G06V 10/60* (2022.01); *G06T 7/194* (2017.01); *G06V 10/25* (2022.01); *G06V 10/761* (2022.01);
(Continued)

(58) Field of Classification Search
CPC ...... G06V 10/60; G06V 10/25; G06V 10/761; G06T 7/194; G06T 2207/10024;
(Continued)

(56) References Cited

U.S. PATENT DOCUMENTS 5,220,442 A * 6/1993 Dingwall .............. G02F 1/1347
445/24
6,141,433 A * 10/2000 Moed ...................... G06T 7/246
348/E5.064

(Continued)

FOREIGN PATENT DOCUMENTS

| CN | 108416333 | 8/2018 |
| CN | 111970432 | 11/2020 |

OTHER PUBLICATIONS

"Office Action of Taiwan Counterpart Application", issued on Jan. 31, 2023, p. 1-p. 8.

*Primary Examiner* — Aaron W Carter
(74) *Attorney, Agent, or Firm* — JCIPRNET

(57) ABSTRACT

An image processing apparatus and an image processing method are provided. The image processing apparatus includes a first image capturing apparatus, a second image capturing apparatus, a storage apparatus, and a processor. The first image capturing apparatus captures a color image. The second image capturing apparatus captures a grayscale image. The storage apparatus stores multiple program modules. The processor is coupled to the first image capturing apparatus, the second image capturing apparatus, and the storage apparatus. The processor is configured to obtain a reference area according to the grayscale image, calculate a luminance value according to the color image and the reference area, adjust luminance of the color image according to the luminance value, and output the adjusted color image.

18 Claims, 15 Drawing Sheets

(51) Int. Cl.
*G06V 10/25* (2022.01)
*G06V 10/74* (2022.01)

(52) U.S. Cl.
CPC ............... *G06T 2207/10024* (2013.01); *G06T 2207/10144* (2013.01); *G06T 2207/30196* (2013.01)

(58) Field of Classification Search
CPC .......... G06T 2207/10144; G06T 2207/30196; H04N 23/71; H04N 5/202
See application file for complete search history.

(56) References Cited

U.S. PATENT DOCUMENTS

| | | | | |
|---|---|---|---|---|
| 9,319,595 | B2* | 4/2016 | Kawarada | H04N 23/73 |
| 10,198,794 | B2* | 2/2019 | Bonnier | G06T 7/194 |
| 2002/0037103 | A1* | 3/2002 | Hong | G06T 7/194 |
| | | | | 382/173 |
| 2006/0284976 | A1* | 12/2006 | Girgensohn | G06F 16/786 |
| | | | | 348/135 |
| 2008/0143739 | A1* | 6/2008 | Harris | G09G 5/377 |
| | | | | 345/604 |
| 2008/0247670 | A1* | 10/2008 | Tam | G06T 7/50 |
| | | | | 348/51 |
| 2009/0179999 | A1* | 7/2009 | Albu | G06T 3/4053 |
| | | | | 348/222.1 |
| 2009/0185753 | A1* | 7/2009 | Albu | H04N 1/60 |
| | | | | 382/260 |
| 2010/0142847 | A1* | 6/2010 | Moon | G06T 5/92 |
| | | | | 382/274 |
| 2013/0162762 | A1* | 6/2013 | Cohen | H04N 13/261 |
| | | | | 348/E9.037 |
| 2013/0162765 | A1* | 6/2013 | Cohen | H04N 13/261 |
| | | | | 348/43 |
| 2013/0162766 | A1* | 6/2013 | Cohen | H04N 13/261 |
| | | | | 348/43 |
| 2013/0293748 | A1* | 11/2013 | Fukutomi | H04N 23/76 |
| | | | | 348/254 |
| 2013/0308012 | A1* | 11/2013 | Fukutomi | H04N 1/407 |
| | | | | 348/229.1 |
| 2014/0085398 | A1* | 3/2014 | Tian | H04N 7/15 |
| | | | | 348/14.01 |
| 2015/0117750 | A1* | 4/2015 | Minato | G06T 7/143 |
| | | | | 382/141 |
| 2016/0292532 | A1* | 10/2016 | Yoshida | H04N 1/3872 |
| 2017/0187566 | A1* | 6/2017 | Fu | H04W 4/80 |
| 2017/0294000 | A1* | 10/2017 | Shen | G06F 3/0482 |
| 2018/0241927 | A1* | 8/2018 | Chen | H04N 23/10 |
| 2018/0325369 | A1* | 11/2018 | Tang | A61B 3/032 |
| 2019/0188454 | A1* | 6/2019 | Yuan | H04N 23/70 |
| 2019/0289186 | A1* | 9/2019 | Saito | H04N 23/74 |
| 2020/0167933 | A1* | 5/2020 | Matsushita | G06T 7/11 |
| 2020/0202155 | A1* | 6/2020 | Ikeda | G06F 18/214 |
| 2022/0292881 | A1* | 9/2022 | Ohno | G06V 10/60 |
| 2024/0135670 | A1* | 4/2024 | Chang | G06T 7/194 |
| 2024/0233316 | A9* | 7/2024 | Chang | H04N 23/71 |
| 2024/0388787 | A1* | 11/2024 | Sugano | H04N 5/275 |

* cited by examiner

| | | | | |
|---|---|---|---|---|
| 0 | 0 | 0 | 0 | 0 |
| 0 | 180 | 230 | 190 | 0 |
| 0 | 250 | 250 | 240 | 0 |
| 0 | 0 | 0 | 0 | 0 |

970

=

| | | | | |
|---|---|---|---|---|
| 0 | 0 | 0 | 0 | 0 |
| 0 | 0 | 0 | 0 | 0 |
| 200 | 0 | 0 | 0 | 0 |
| 230 | 0 | 0 | 0 | 0 |

960

−

801

| | | | | |
|---|---|---|---|---|
| 0 | 180 | 0 | 190 | 0 |
| 0 | 180 | 230 | 190 | 0 |
| 200 | 250 | 250 | 240 | 0 |
| 230 | 0 | 0 | 0 | 0 |

IMAGE PROCESSING APPARATUS AND IMAGE PROCESSING METHOD

CROSS-REFERENCE TO RELATED APPLICATION

This application claims the priority benefit of Taiwan application serial no. 111139780, filed on Oct. 20, 2022. The entirety of the above-mentioned patent application is hereby incorporated by reference herein and made a part of this specification.

BACKGROUND

Technical Field

The disclosure relates to an image processing technology, and more particularly, to an image processing apparatus and an image processing method.

Description of Related Art

At present, most of the cameras (NB WebCam) disposed in notebook computers on the market do not have the high dynamic range (HDR) image processing function. When the brightness range of the scene in the shooting scene changes greatly, the color image captured by the notebook computer camera will be unclear in the areas where the brightness of the scene is too dark, or the image in the areas where the brightness of the scene is too bright is overexposed, and the details of the image may not be recognized.

Although the imaging system of high-end notebook computers may be equipped with the HDR function to handle the scenes with large changes in the brightness range, the HDR function of the high-end notebook computers requires a large amount of computation to support HDR image processing. For low-end and mid-range notebook computer products, due to the computational load and hardware configuration, most of them are not equipped with the HDR function. The color images captured by the cameras of the low-end and mid-range notebook computer products will have the issue of unclear image in the area caused by the brightness of the scene in the scenes with large changes in the brightness range.

SUMMARY

In view of this, according to the embodiments of the disclosure, an image processing apparatus and an image processing method are provided, which may use a grayscale image function of an existing camera to assist in improving an issue of image luminance of a color image, such as red-green-blue (RGB) image, when a brightness range of a scene is large.

According to an embodiment of the disclosure, an image processing apparatus including a first image capturing apparatus, a second image capturing apparatus, a storage apparatus, and a processor is provided. The first image capturing apparatus captures a color image. The second image capturing apparatus captures a grayscale image. The storage apparatus stores multiple program modules. The processor is coupled to the first image capturing apparatus, the second image capturing apparatus, and the storage apparatus. The processor is configured to obtain a reference area according to the grayscale image, calculate a luminance value according to the color image and the reference area, adjust luminance of the color image according to the luminance value, and output the adjusted color image.

According to an embodiment of the disclosure, an image processing method is provided, which includes the following. A reference area is obtained from a grayscale image. A luminance value is calculated according to a color image and the reference area. Luminance of the color image is adjusted according to the luminance value. The adjusted color image is output.

Based on the above, the image processing apparatus and the image processing method provided in the embodiments of the disclosure may obtain the reference area from the grayscale image, calculate the luminance value according to the color image and the reference area, and adjust the luminance of the color image according to the luminance value. In this way, the grayscale image function of the existing camera may be used to improve an issue that a human image is too dark or too bright due to the backlight without changing the hardware of the image processing apparatus.

BRIEF DESCRIPTION OF THE DRAWINGS

FIGS. 8 and 9 are schematic views of removing a background grayscale image from a grayscale image according to an embodiment of the disclosure.

DETAILED DESCRIPTION OF DISCLOSED EMBODIMENTS

Figure 1:
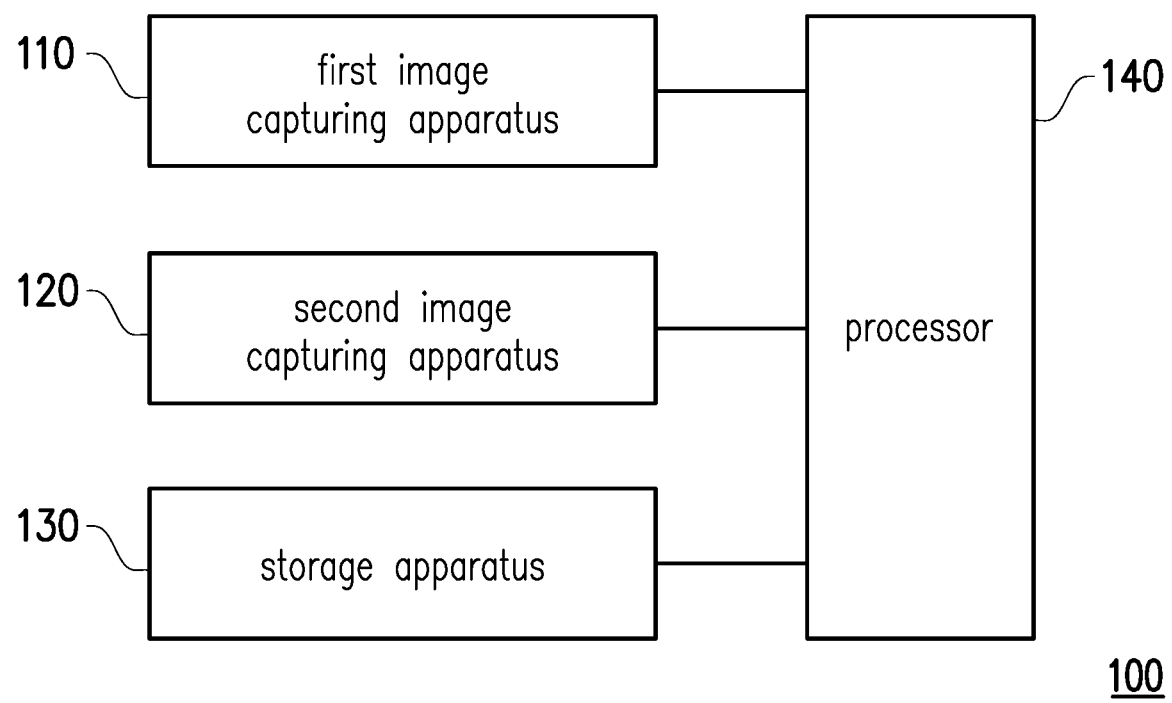
FIG. 1 is a schematic view of an image processing apparatus according to an embodiment of the disclosure.

Some embodiments of the disclosure accompanied with the drawings will now be described in detail. For the reference numerals recited in description below, the same reference numerals shown in different drawings will be regarded as the same or similar elements. These embodiments are only a part of the disclosure, and do not disclose all the possible implementations of the disclosure. To be more precise, these embodiments are only examples of the appended claims of the disclosure. Wherever possible, elements/components/steps with the same reference numerals in the drawings and embodiments represent the same or similar parts. Cross-reference may be made between the elements/components/steps in different embodiments that are denoted by the same reference numerals or that have the same names.

FIG. 1 is a schematic view of an image processing apparatus according to an embodiment of the disclosure. An image processing apparatus 100 includes a first image capturing apparatus 110, a second image capturing apparatus 120, a storage apparatus 130, and a processor 140. The processor 140 is coupled to the first image capturing apparatus 110, the second image capturing apparatus 120, and the storage apparatus 130. The image processing apparatus 100 may be disposed in electronic apparatuses such as personal computers, tablet computers, notebook computers, smart phones, in-vehicle apparatuses, household apparatuses, digital cameras, and digital video cameras that may provide imaging functions.

The first image capturing apparatus 110 captures a color image. The first image capturing apparatus 110 is a digital camera, a video camera, or an imaging lens having a lens and a photosensitive element. The photosensitive element is configured to sense intensity of light entering the lens, thereby generating an image. The photosensitive element is, for example, a charge coupled device (CCD), a complementary metal-oxide semiconductor (CMOS) device, or other elements, and may sense the intensity of the light to generate an image of an imaging scene. The first image capturing apparatus 110 is, for example, a red-green-blue (RGB) image sensor, including red (R), green (G), and blue (B) color pixels, which are configured to capture color information such as red light, green light, and blue light in the imaging scene, and synthesize the color information to generate a color image of the imaging scene.

The second image capturing apparatus 120 captures a grayscale image. The second image capturing apparatus 120 may include the CCD, the CMOS device, or other types of photosensitive elements. In an embodiment, the second image capturing apparatus 120 is, for example, a depth camera or other similar elements, which may calculate depth information ahead by actively emitting light sources, ultrasonic waves, lasers, etc. as signals. In an embodiment, the second image capturing apparatus 120 is an infrared (IR) camera, which may sense infrared light by adjusting a wavelength sensing range of the photosensitive element. For example, the above photosensitive element is used as a pixel to capture infrared light information in the imaging scene, and the infrared light information is synthesized to generate a grayscale image of the imaging scene. In some embodiments, the first image capturing apparatus 110 and the second image capturing apparatus 120 may be a combination of an RGB-D camera with a ranging function, a binocular camera, an RGB camera, and a lidar sensor.

The storage apparatus 130 may store computer programs. In an embodiment, the storage apparatus 130 is any type of fixed or removable random access memory, a read-only memory (ROM), a flash memory, a hard disk drive (HDD), a solid state drive (SSD), similar elements, or a combination of the above elements. The storage apparatus 130 is configured to store multiple modules, computer programs, or various application programs that may be executed by the processor 140.

The processor 140 is configured to be responsible for all or some operations of the image processing apparatus 100. In an embodiment, the processor 140 is a central processing unit (CPU), other programmable general-purpose or special-purpose micro control units (MCUs), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), other similar elements, or a combination of the above elements.

Figure 2:
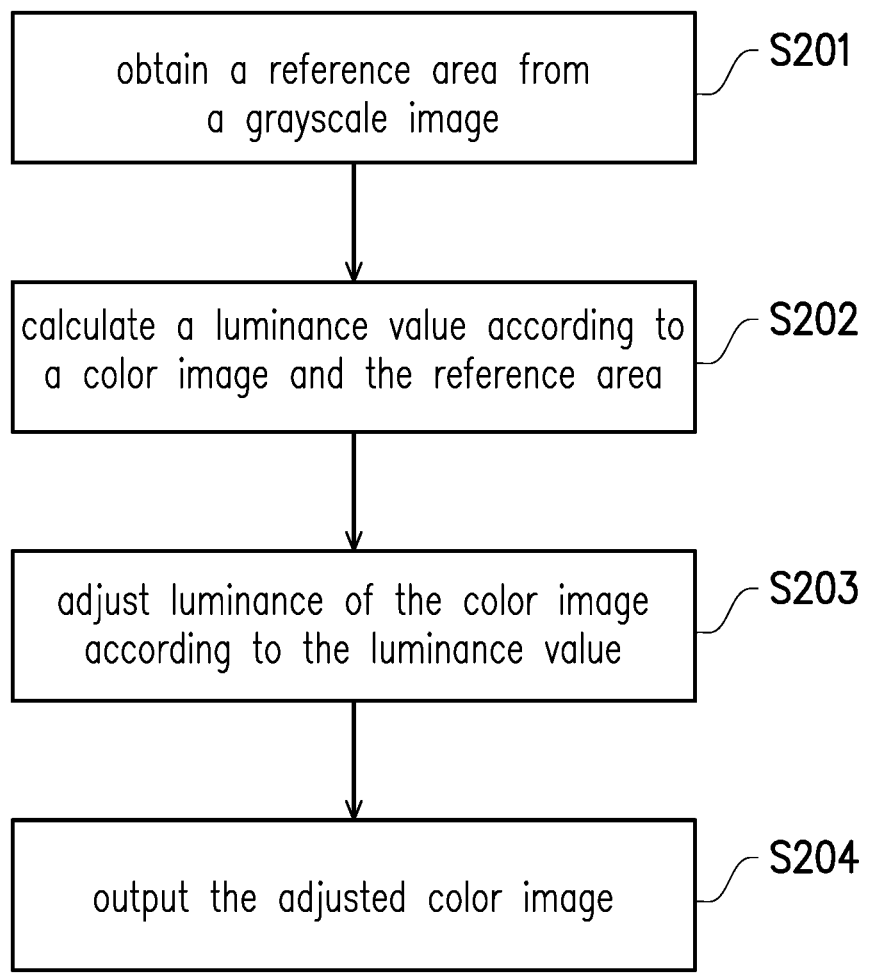
FIG. 2 is a flowchart of an image processing method according to an embodiment of the disclosure.

FIG. 2 is a flowchart of an image processing method according to an embodiment of the disclosure. The image processing method shown in FIG. 2 is applicable to the image processing apparatus 100 of FIG. 1. In step S201, the processor 140 obtains a reference area from the grayscale image. In step S202, the processor 140 calculates a luminance value according to the color image and the reference area. In step S203, the processor 140 adjusts luminance of the color image according to the luminance value. In step S204, the processor 140 outputs the adjusted color image.

Figure 3:
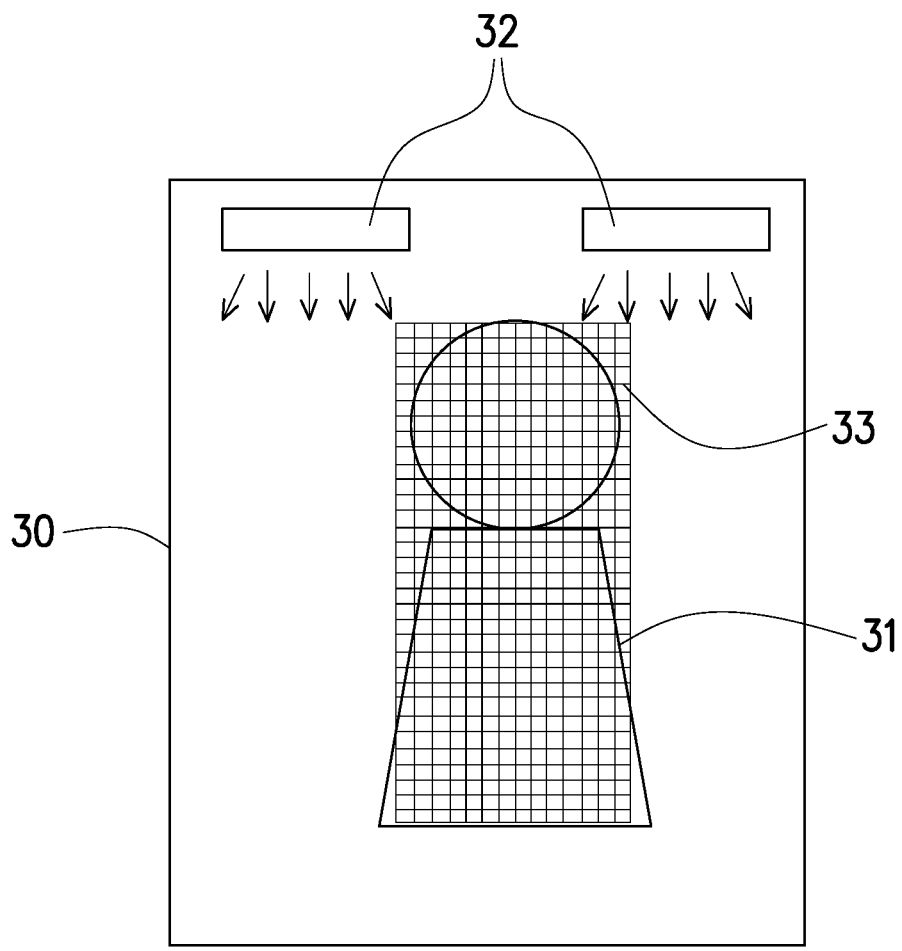
FIG. 3 is a schematic view of a color image and a reference area in an embodiment of the disclosure.

FIG. 3 is a schematic view of a color image and a reference area in an embodiment of the disclosure. Referring to FIG. 3, in an embodiment, a color image 30 captured by the first image capturing apparatus 110 may include a human image 31 or a light image 32. In the embodiment of the disclosure, the grayscale image captured by the second image capturing apparatus 120 may be processed to obtain a reference area 33 corresponding to the color image 30. In some embodiments, the reference area 33 is an area including the human image 31. In other embodiments, the reference area 33 is an area including the light image 32.

Specifically, the reference area 33 may be used to calculate a luminance value of a pixel position corresponding to the reference area 33 in the color image 30. The luminance value may be used to determine whether a portion of the color image 30 corresponding to the reference area 33 is too dark or too bright, and luminance of the color image 30 is adjusted according to a determination result of the luminance value. When the reference area 33 is the area including the human image 31, the calculated luminance value is compared to a preset luminance. If the luminance value is less than the preset luminance, it indicates that the human image 31 of the color image 30 is too dark, and the luminance of the color image 30 may be adjusted according to the determination result. When the reference area 33 is the area including the light image 32, the calculated luminance value is compared to a threshold value. If the luminance value is greater than or equal to the threshold value, it indicates that the light image 32 of the color image 30 is too bright, and the luminance of the color image 30 may be adjusted according to the determination result. In this way, without changing a hardware structure of the image processing apparatus 100, the luminance of the color image 30 may be adjusted according to the reference area 33, and an issue of the unclear human image caused by backlight may be improved.

In an embodiment, the second image capturing apparatus 120 includes an infra-red light-emitting diode (IR LED). When the infra-red light-emitting diode is turned on, the second image capturing apparatus 120 may receive the light reflected by the infra-red light-emitting diode illuminating the person in the scene. In this way, the grayscale image captured by the second image capturing apparatus 120 may capture an obvious human image. On the contrary, when the infra-red light-emitting diode is turned off, the second image capturing apparatus 120 does not receive the light reflected by the infra-red light-emitting diode. At this time, the grayscale image captured by the second image capturing apparatus 120 only includes a background image in the imaging scene and may not capture the human image in the scene. In an embodiment of the disclosure, a step of obtaining the reference area from the grayscale image include the following. A background grayscale image is captured, and the grayscale image is compared to the background grayscale image to obtain the reference area. Specifically, by comparing the grayscale image captured by the second image capturing apparatus 120 when the infra-red light-emitting diode is turned on and the background grayscale image captured by the second image capturing apparatus 120 when the infra-red light-emitting diode is turned off, the corresponding pixel position of the human image 31 or the light image 32 in the color image 30 may be determined, and the reference area 33 may be obtained.

Figure 4:
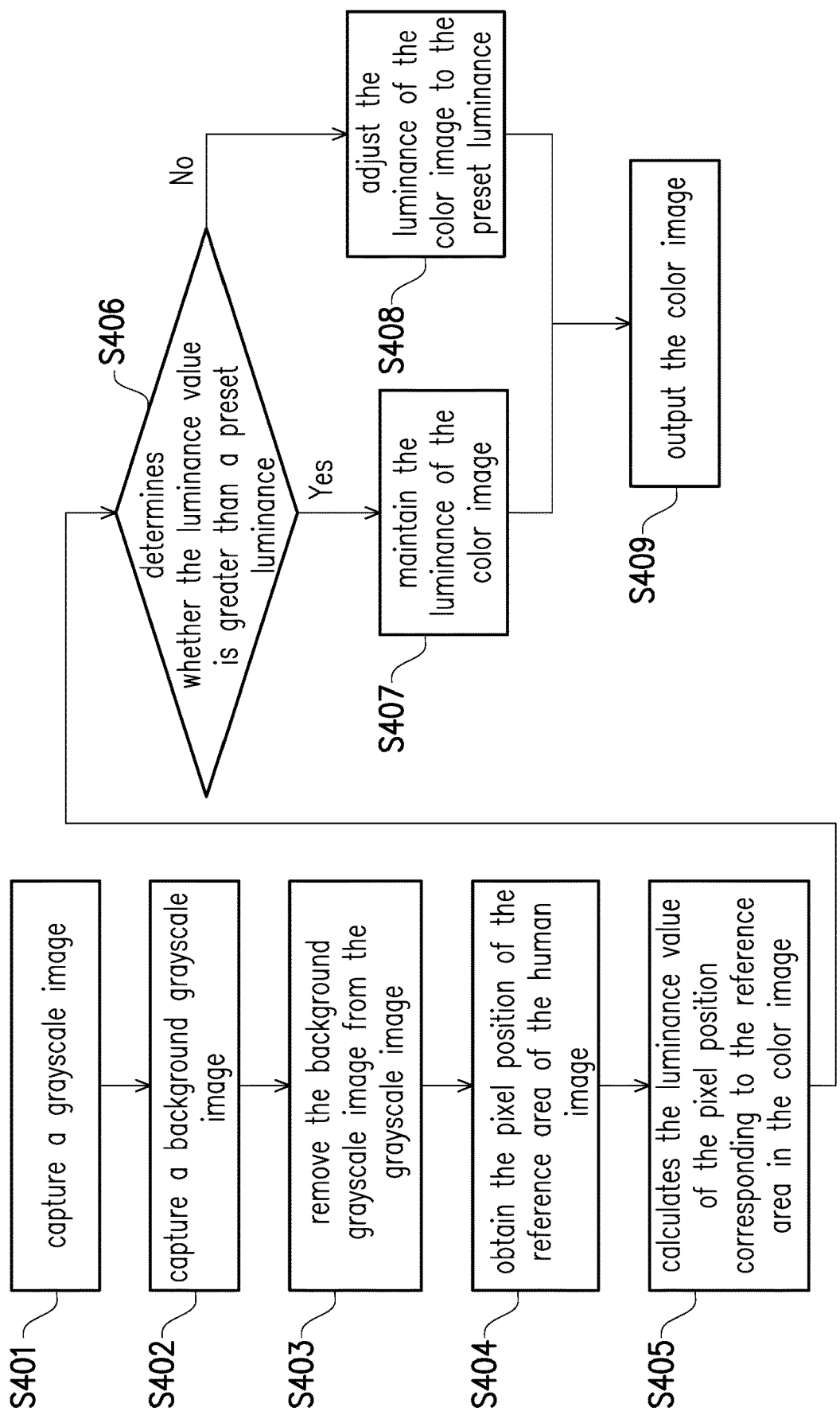
FIG. 4 is a flowchart of an image processing method according to an embodiment of the disclosure.

FIG. 4 is a flowchart of an image processing method according to an embodiment of the disclosure. The image processing method shown in FIG. 4 is applicable to the image processing apparatus 100 of FIG. 1.

Figure 5:
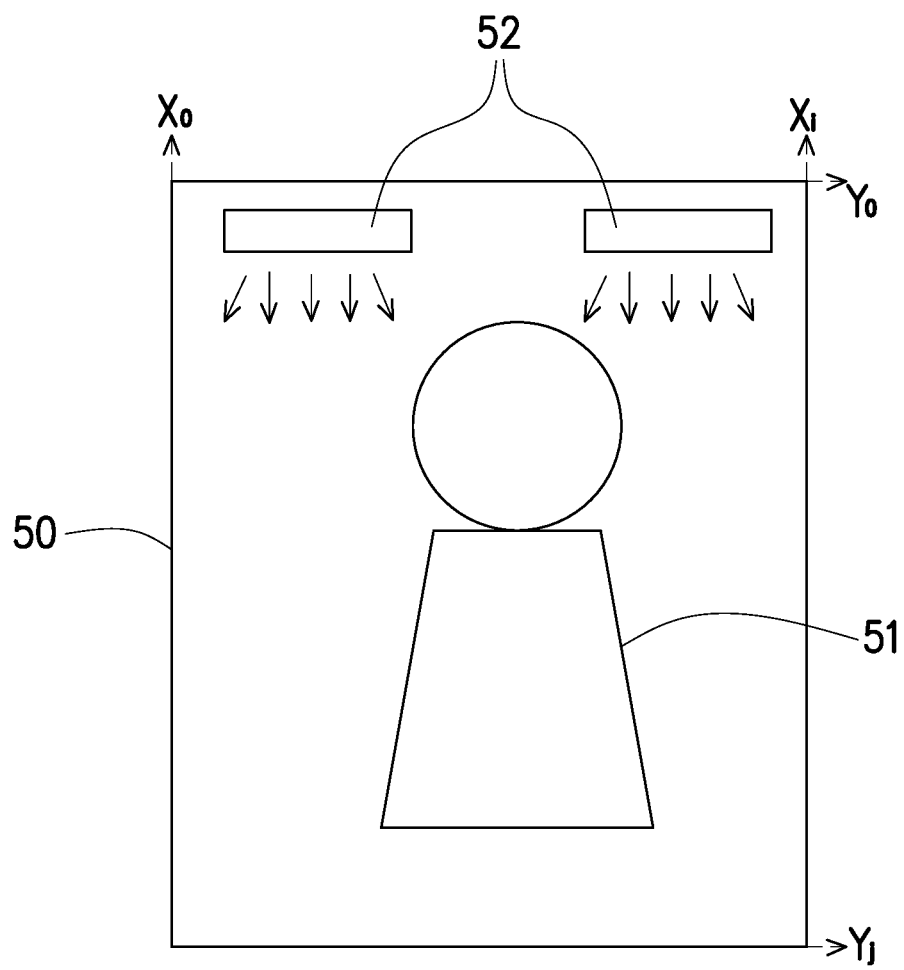
FIG. 5 is a schematic view of a grayscale image in an embodiment of the disclosure.

In step S401, the second image capturing apparatus 120 captures the grayscale image. FIG. 5 is a schematic view of a grayscale image in an embodiment of the disclosure. Specifically, a grayscale image 50 is an image captured by the second image capturing apparatus 120 when the infra-red light-emitting diode is turned on. In an embodiment, the grayscale image 50 includes a human image 51 and a light image 52.

Figure 6:
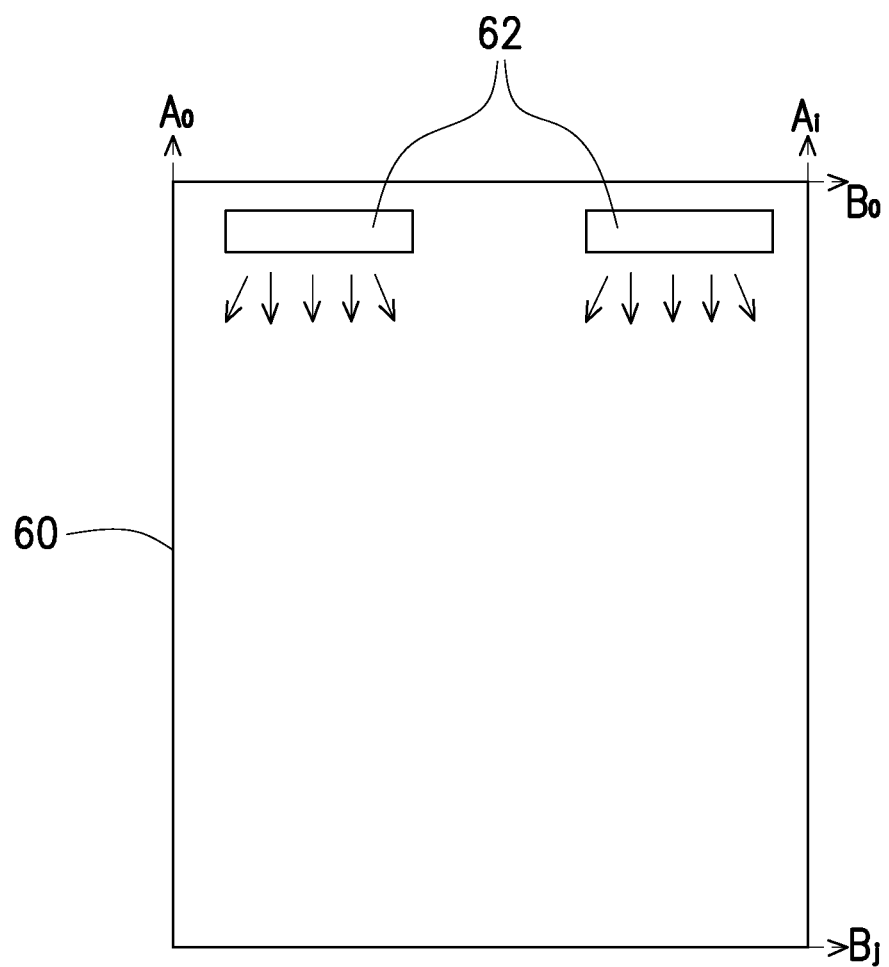
FIG. 6 is a schematic view of a background grayscale image in an embodiment of the disclosure.

In step S402, the second image capturing apparatus 120 captures the background grayscale image. FIG. 6 is a schematic view of a background grayscale image in an embodiment of the disclosure. Specifically, a background grayscale image 60 is an image captured by the second image capturing apparatus 120 when the infra-red light-emitting diode is turned off. In an embodiment, the background grayscale image 60 includes a light image 62.

Figure 7:
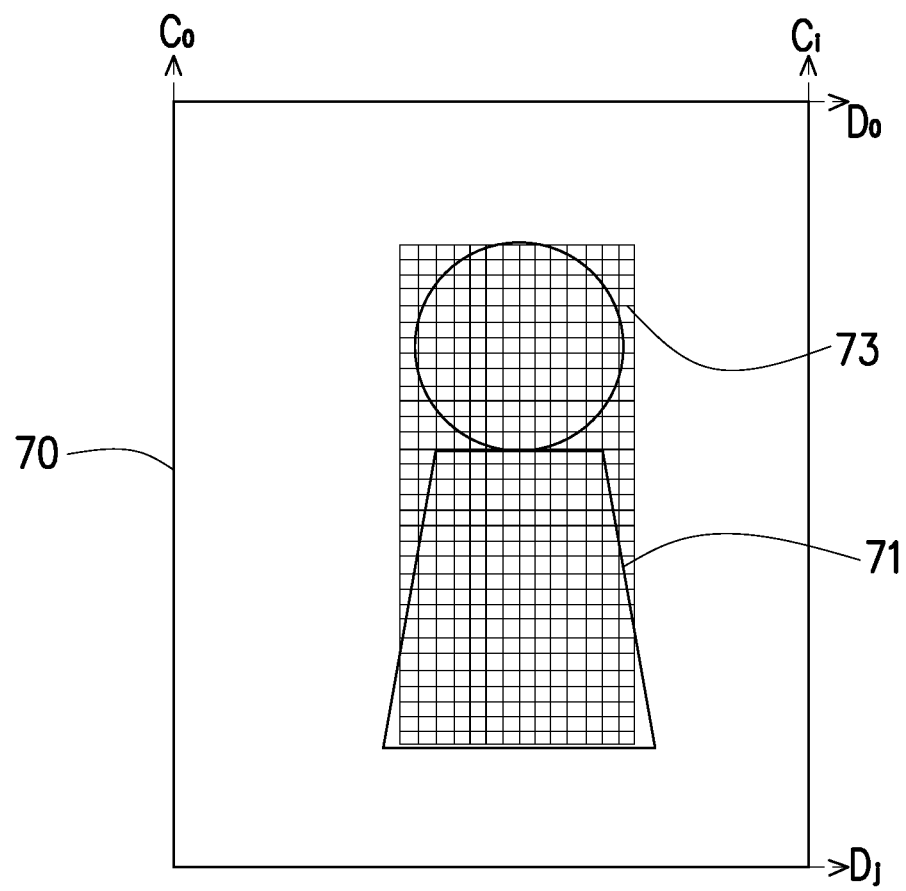
FIG. 7 is a schematic view of obtaining a reference area from a grayscale image according to an embodiment of the disclosure.

FIG. 7 is a schematic view of obtaining a reference area from the grayscale image 50 according to an embodiment of the disclosure. In an embodiment, the processor 140 may compare common portions of the grayscale image 50 and the background grayscale image 60, such as the light image 52 in the grayscale image 50 and the light image 62 in the background grayscale image 60, and may remove the light image 52 in the grayscale image 50 while retaining the human image 51 to obtain a grayscale image 70. For example, a reference area 73 is an area including a human image 71.

Figure 8:
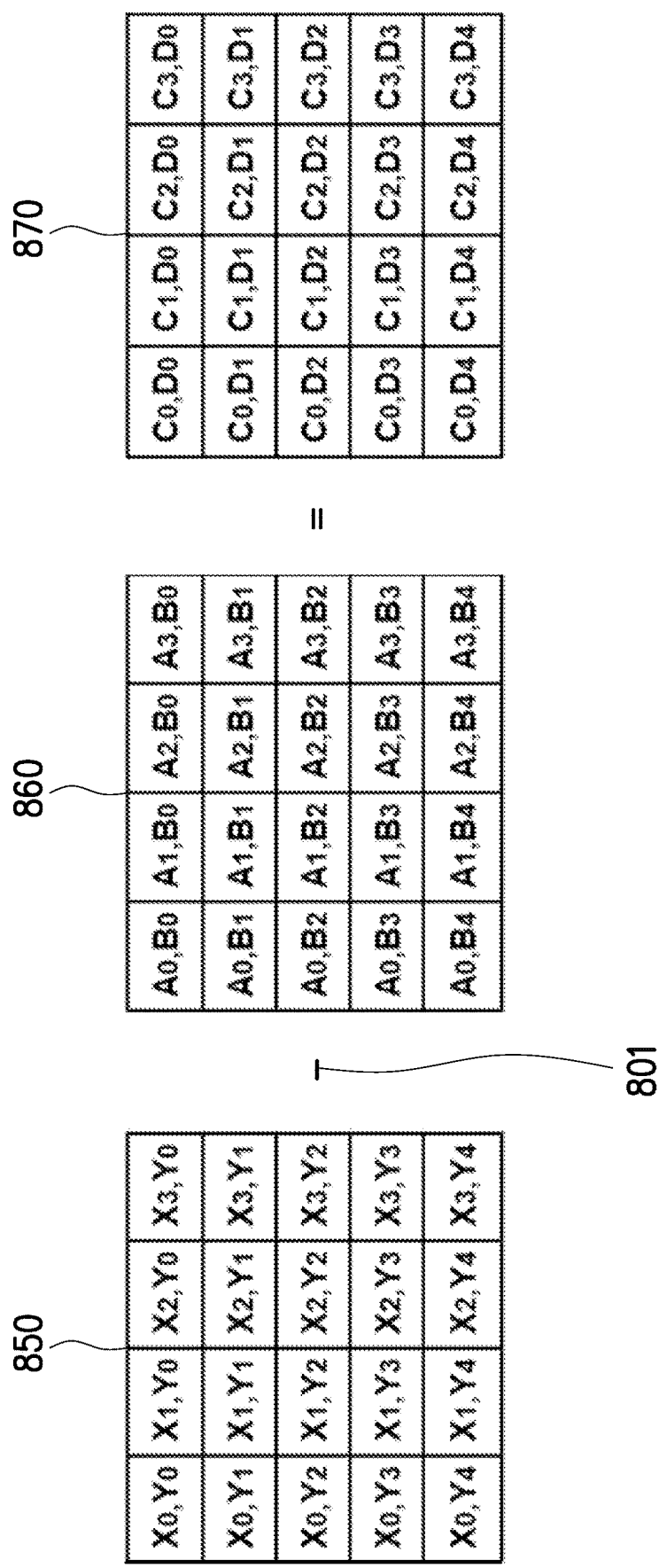

In step S403, the processor 140 removes the background grayscale image 60 from the grayscale image 50 to obtain the reference area 73. FIGS. 8 and 9 are schematic views of removing the background grayscale image 60 from the grayscale image 50 according to an embodiment of the disclosure. Specifically, the processor 140 uses a pixel position of the grayscale image 50 and a pixel position of the background grayscale image 60 to perform subtraction on the luminance value of each of the pixel positions, as shown in the following formula (1).

$$[X_0, Y_0]-[A_0, B_0]=[C_0, D_0], \ldots, [X_i-Y_j]-[A_i, B_j]=[C_i, D_j] \quad \text{formula (1)}$$

$X_0$, $A_0$, $C_0$, $X_i$, $A_i$, and $C_i$ are coordinate points of horizontal pixel positions, where i may be a positive integer value.

$Y_0$, $B_0$, $D_0$, $Y_j$, $B_j$, and $D_j$ are coordinate points of vertical pixel positions, where j may be a positive integer value.

$[X_0, Y_0]$, $[A_0, B_0]$, $[C_0, D_0]$, ..., $[X_i, Y_j]$, $[A_i, B_j]$, $[C_i, D_j]$ are the luminance values of each of the pixel positions, where i and j may be the positive integer values, but different values.

Since each of the pixel positions corresponds to one luminance value (Lux), by subtracting the luminance value of the pixel position corresponding to the grayscale image 50 from the luminance value of the pixel position corresponding to the background grayscale image 60, the light image 52 and the light image 62 in common backgrounds of the grayscale image 50 and the background grayscale image 60 are removed, and the luminance value of the pixel position corresponding to the human image 51 after the subtraction is left.

For example, as shown in FIG. 8, the grayscale image 50 corresponds to a pixel position 850, and the background grayscale image 60 corresponds to a pixel position 860. The grayscale image 70 after a subtraction operation 801 corresponds to a pixel position 870. In FIG. 9, the pixel position 850 corresponds to multiple luminance values 950. The pixel position 860 corresponds to multiple luminance values 960. The pixel position 870 corresponds to multiple luminance values 970. After the subtraction operation 801, the remaining luminance value of the luminance values 970 is the luminance value of the pixel position corresponding to the human image 71.

In step S404, the processor 140 obtains the pixel position 870 of the reference area 73 of the human image 71.

In step S405, the processor 140 calculates the luminance value of the pixel position corresponding to the reference area 73 in the color image 30. Specifically, the processor 140 captures an RGB value of each of pixels located at the pixel position of the reference area 73 in the color image 30 according to the pixel position of the reference area 73, and converts the RGB value into the luminance value. In an embodiment, the luminance value (L) is calculated by the following formula (3).

$$\text{The luminance value}(L)=0.299*R+0.587*G+0.114*B \quad \text{formula (3)}$$

For example, when the RGB value of one pixel is (R, G, B)=(61.489, 49.160, 55.964), the calculated luminance value is 0.299*61.489+0.587*49.160+0.114*55.964=53.6 (Lux).

In step S406, the processor 140 determines whether the luminance value is greater than a preset luminance. Specifically, the preset luminance may indicate the luminance that is required to be achieved for the human image 31 of the color image 30 to be clearly displayed in the imaging scene. If the luminance value is less than the preset luminance, it indicates that the human image 31 of the color image 30 is too dark. The preset luminance may be set differently according to application scenarios. In an embodiment, the preset luminance is set to "120 (Lux)".

When a determination result in step S406 is "Yes", in step S407, the processor 140 maintains the luminance of the color image 30.

When the determination result in step S406 is "No", in step S408, the processor 140 adjusts the luminance of the color image 30 to the preset luminance.

In step S409, the processor 140 outputs the color image 30.

Figure 10:
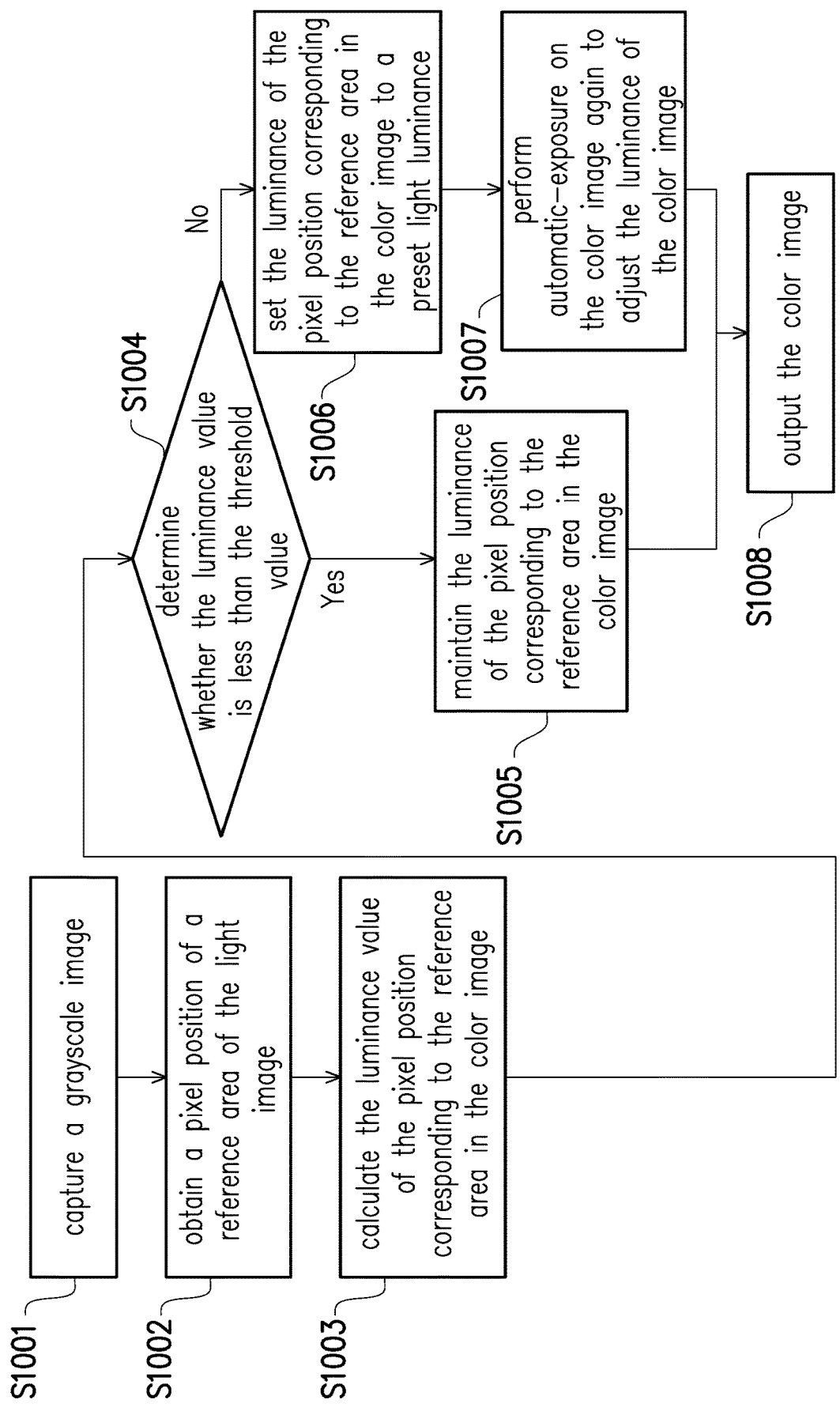
FIG. 10 is a flowchart of an image processing method according to an embodiment of the disclosure.

FIG. 10 is a flowchart of an image processing method according to an embodiment of the disclosure. The image processing method shown in FIG. 10 is applicable to the image processing apparatus 100 of FIG. 1.

Figure 11:
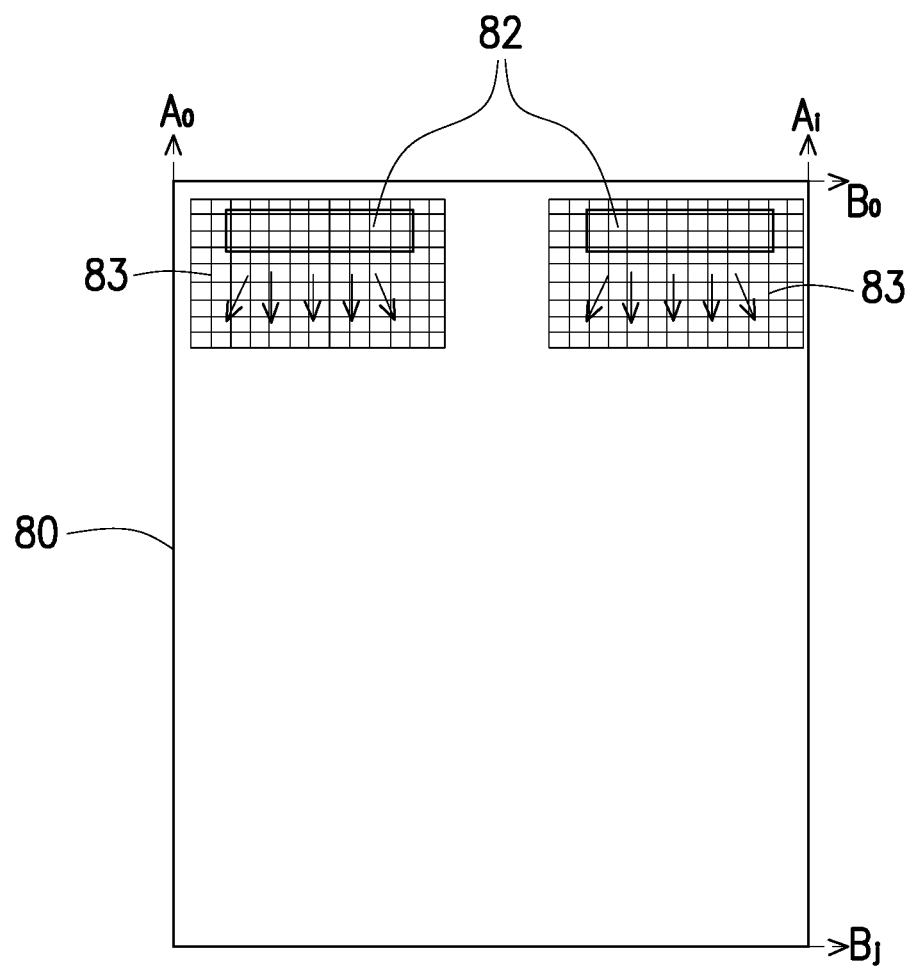
FIG. 11 is a schematic view of obtaining a reference area from a grayscale image according to an embodiment of the disclosure.

In step S1001, the second image capturing apparatus 120 captures the grayscale image. FIG. 11 is a schematic view of obtaining a reference area from a grayscale image according to an embodiment of the disclosure. As shown in FIG. 11, a grayscale image 80 is an image captured by the second image capturing apparatus 120 when the infra-red light-emitting diode is turned off. In an embodiment, the grayscale image 80 includes a light image 82. In step S1002, the processor 140 obtains a pixel position of a reference area 83 of the light image 82. Specifically, luminance of pixels located in the reference area 83 of the light image 82 is generally greater than luminance of pixels outside the reference area 83. In an embodiment, whether each of pixels of the grayscale image 80 is the pixel of the reference area 83 of the light image 82 may be determined according to a background luminance value. If the luminance of the pixel is greater than the background luminance value, it is determined that the pixel is the pixel of the reference area 83 of the light image 82. The background luminance value may be predetermined according to different application scenarios.

Figure 12:
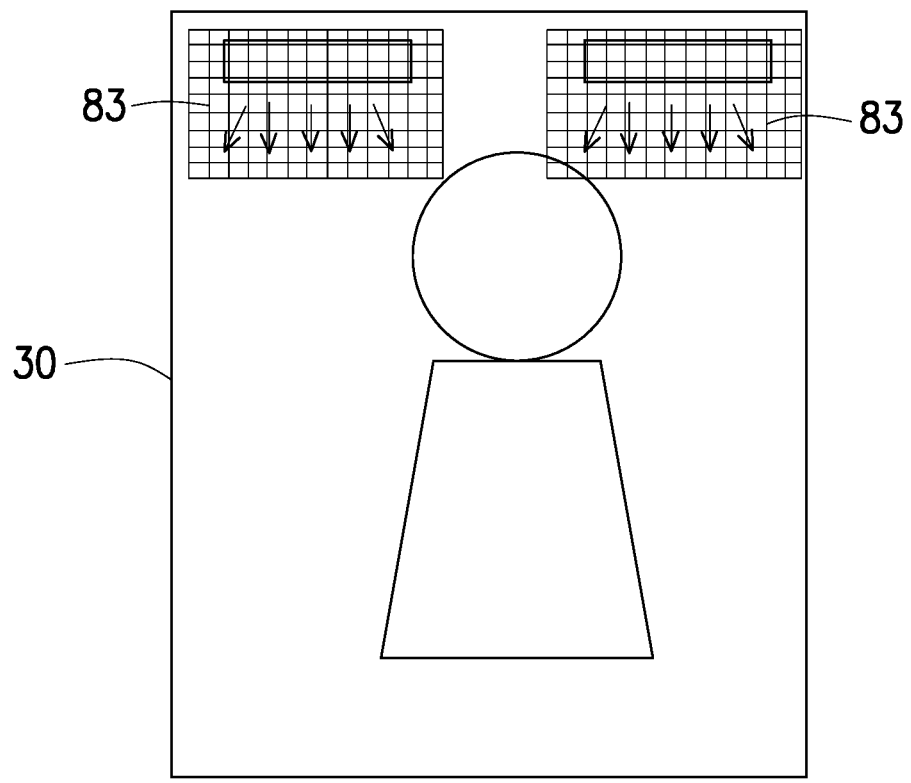
FIG. 12 is a schematic view of a pixel position corresponding to a reference area in a color image according to an embodiment of the disclosure.

FIG. 12 is a schematic view of a pixel position corresponding to the reference area 83 in the color image 30 according to an embodiment of the disclosure. In step S1003, the processor 140 calculates the luminance value of the pixel position corresponding to the reference area 83 in the color image 30.

The processor 140 captures the RGB value of each of the pixels located at the pixel position of the reference area 83 in the color image 30 according to the pixel position of the reference area 83, and converts the RGB value into the luminance value. In an embodiment, the luminance value (L) is calculated by the foregoing formula (3).

Figure 13:
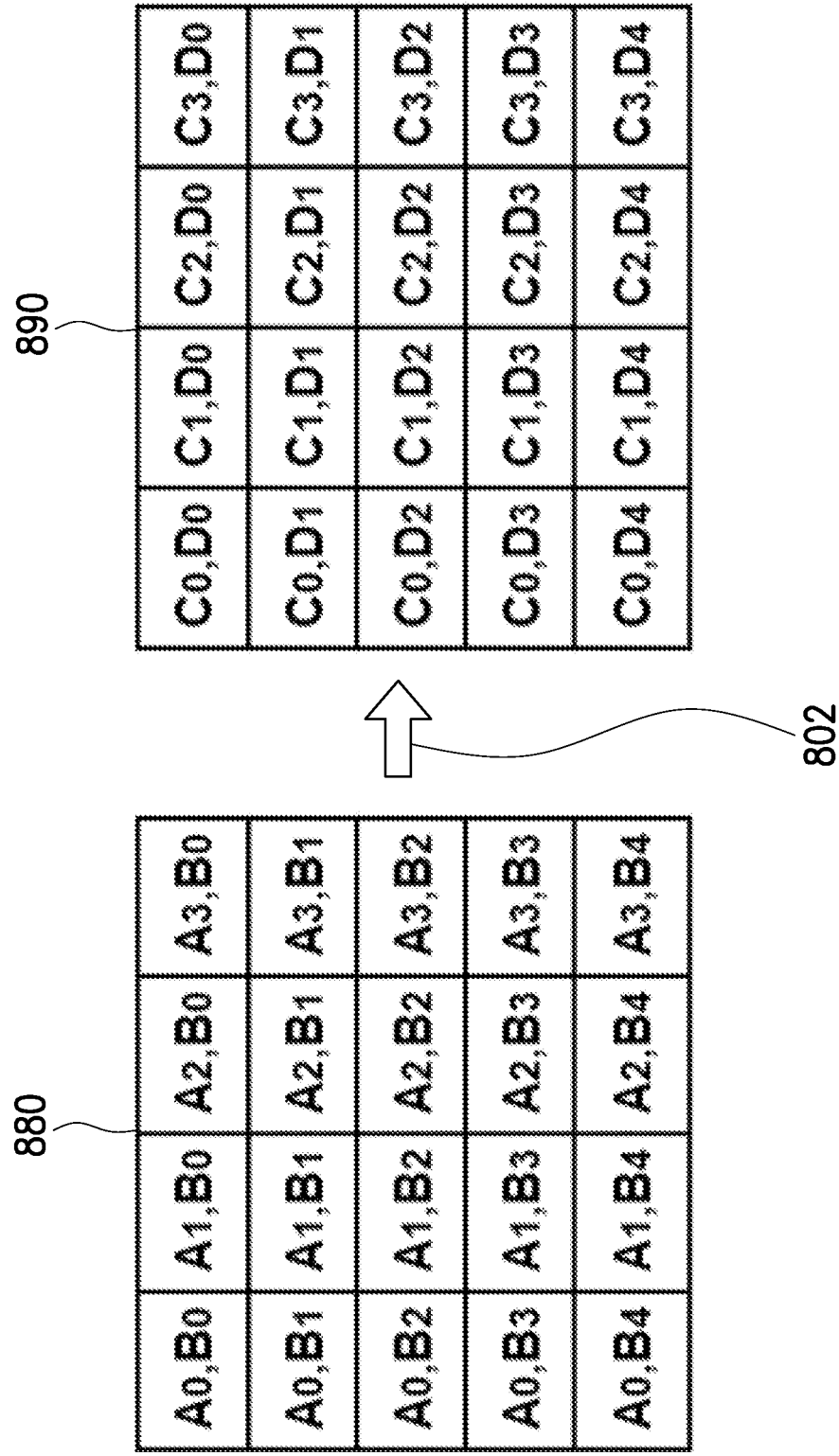
FIGS. 13 and 14 are schematic views of calculating a luminance value of a pixel position corresponding to a reference area in a color image according to an embodiment of the disclosure.
Figure 14:
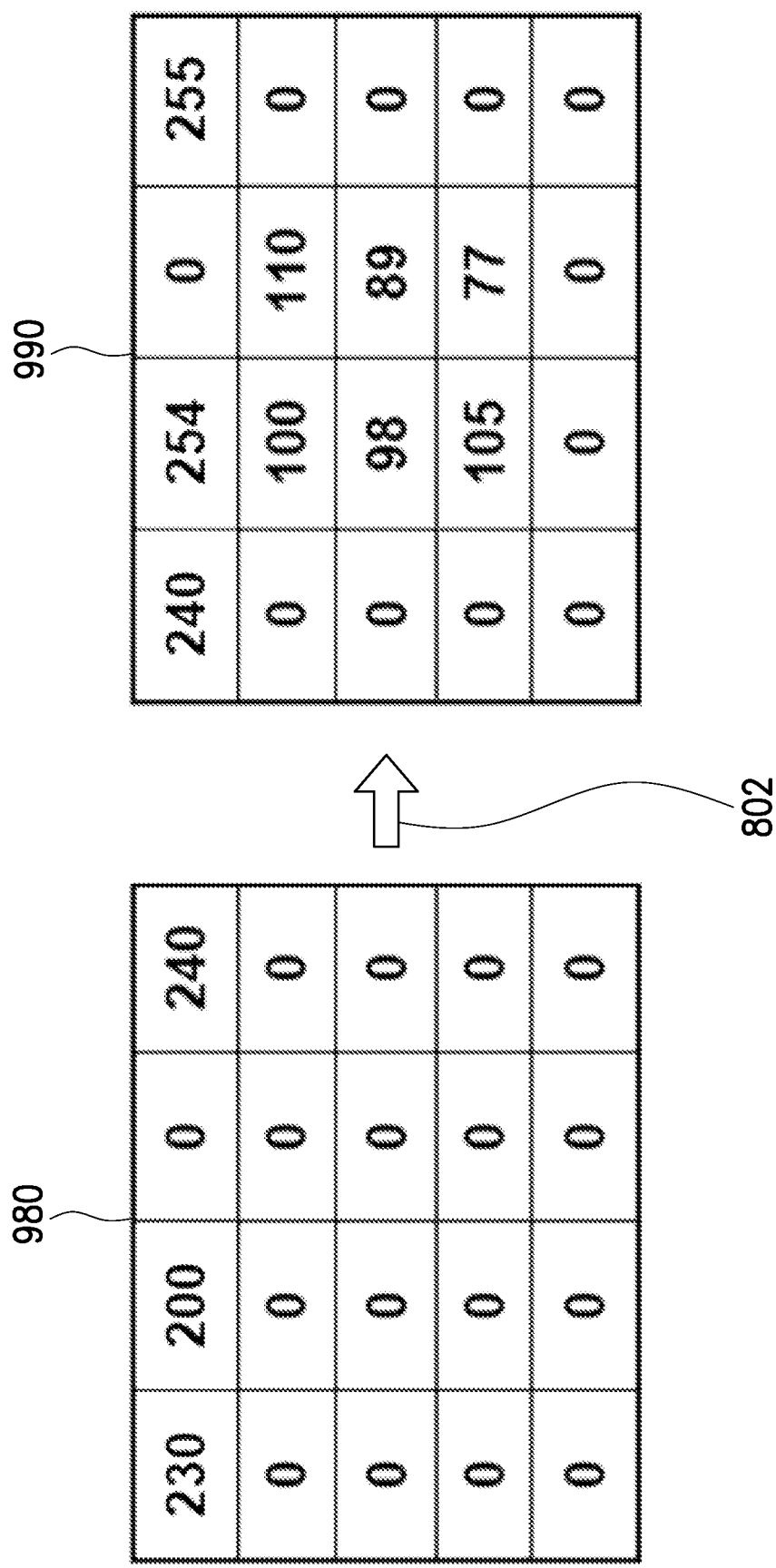

FIGS. 13 and 14 are schematic views of calculating the luminance value of the pixel position corresponding to the reference area 83 in the color image 30 according to an embodiment of the disclosure.

For example, as shown in FIG. 13, the grayscale image 80 corresponds to a pixel position 880. After a conversion 802 corresponding to the pixel position of the reference area 83 is performed on the grayscale image 80, a pixel position 890 corresponding to the color image 30 may be obtained. In FIG. 14, the pixel position 880 corresponds to multiple luminance values 980. The pixel position 890 corresponds to multiple luminance values 990. The luminance values 990 are the luminance values of the pixel position corresponding to the reference area 83 in the color image 30.

In step S1004, the processor 140 determines whether the luminance value is less than the threshold value. Specifically, the threshold value may indicate a limit in luminance of the light image 32 of the color image 30. If the luminance value is greater than or equal to the threshold value, it indicates that the light image 32 of the color image 30 is too bright, and the processor 140 reduces the luminance of the pixel position corresponding to the reference area 83 in the color image 30. The threshold value may be set differently according to the application scenarios. In an embodiment, the threshold value is set to "250 (Lux)".

When a determination result in step S1004 is "Yes", in step S1005, the processor 140 maintains the luminance of the pixel position corresponding to the reference area 83 in the color image 30.

When the determination result in step S1004 is "No", in step S1006, the processor 140 sets the luminance of the pixel position corresponding to the reference area 83 in the color image 30 to a preset light luminance. Specifically, the preset light luminance may indicate that the light image 32 in the color image 30 does not affect the luminance of the clear display of the human image 31 in the imaging scene. The preset light luminance may be set differently according to the application scenarios. In an embodiment, the preset light luminance is set to "100 (Lux)".

In step S1007, the processor 140 performs automatic-exposure (AE) or back-end whole-frame luminance gain processing on the color image 30 again to adjust the luminance of the color image 30.

In step S1008, the processor 140 outputs the color image 30.

Figure 15:
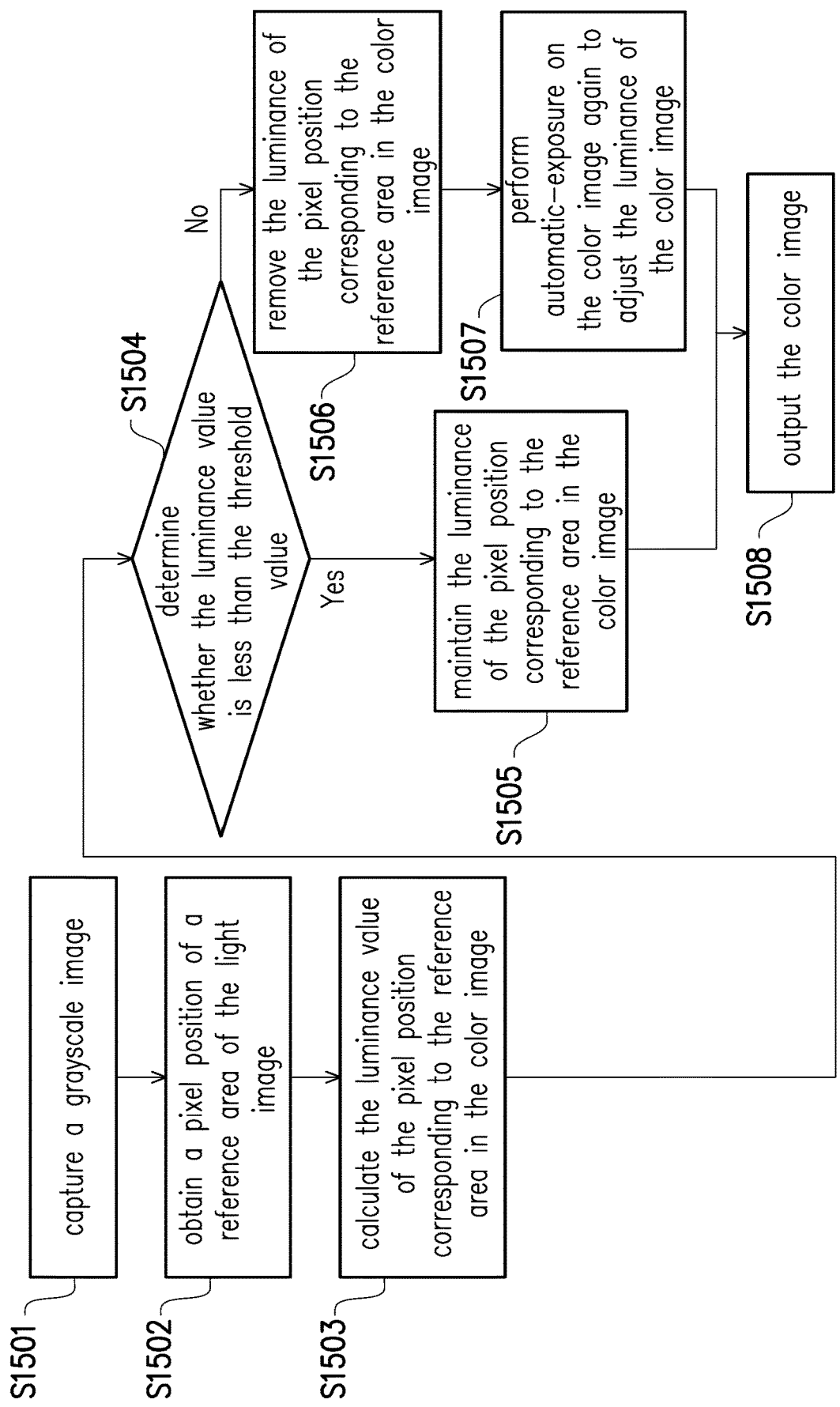
FIG. 15 is a flowchart of an image processing method according to an embodiment of the disclosure.

FIG. 15 is a flowchart of an image processing method according to an embodiment of the disclosure. In FIG. 15, steps S1501, S1502, S1503, S1504, S1505, S1507, and S1508 are the same as steps S1001, S1002, S1003, S1004, S1005, S1007, and S1008 shown in FIG. 10. In step S1506, the processor 140 removes the luminance of the pixel position corresponding to the reference area 83 in the color image 30 in response to a determination result in step S1504 being "No". Specifically, when calculating the luminance value of the formula (3), the processor 140 does not include the luminance of the removed pixel position into the calculation. In this way, the pixels in reference area 83 of the light image 82 may be eliminated, and an issue of backlight may be improved.

Based on the above, the image processing apparatus and the image processing method provided in the embodiments of the disclosure may obtain the reference area from the grayscale image, calculate the luminance value according to the color image and the reference area, and adjust the luminance of the color image according to the luminance value. In the embodiments of the disclosure, the grayscale image function of the existing camera may be used, and the issue of the unclear human image caused by the backlight may be improved without changing the hardware of the image processing apparatus. In this way, in the embodiments of the disclosure, the effect of improving the quality of high dynamic range images may be achieved while saving computation and hardware costs.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An image processing apparatus, comprising:
a first image capturing apparatus, capturing a color image;
a second image capturing apparatus, capturing a grayscale image and a background grayscale image;
a storage apparatus, storing a plurality of program modules; and
a processor, coupled to the first image capturing apparatus, the second image capturing apparatus, and the storage apparatus, wherein the processor:
obtains a reference area according to the grayscale image;
calculates a luminance value according to the color image and the reference area;
compares the grayscale image to the background grayscale image, and the reference area is obtained;
adjusts luminance of the color image according to the luminance value;
in response to the luminance value being less than a preset luminance, adjusts the luminance of the color image to the preset luminance; and
outputs the adjusted color image.

2. The image processing apparatus according to claim 1, wherein the processor further:
  removes the background grayscale image from the grayscale image, and the reference area is obtained.

3. The image processing apparatus according to claim 1, wherein the reference area is an area of a human image.

4. The image processing apparatus according to claim 3, wherein the processor further:
  in response to the luminance value being greater than the preset luminance, maintains the luminance of the color image.

5. The image processing apparatus according to claim 1, wherein the reference area is an area of a light image, and the processor further:
  in response to the luminance value being greater than or equal to a threshold value, reduces luminance of a pixel position corresponding to the reference area in the color image.

6. The image processing apparatus according to claim 5, wherein the processor further:
  in response to the luminance value being less than the threshold value, maintains the luminance of the pixel position corresponding to the reference area in the color image.

7. The image processing apparatus according to claim 5, wherein the processor further:
  sets the luminance of the pixel position corresponding to the reference area in the color image to a preset light luminance.

8. The image processing apparatus according to claim 5, wherein the processor further:
  removes the luminance of the pixel position corresponding to the reference area in the color image.

9. The image processing apparatus according to claim 5, wherein the processor further:
  performs auto-exposure (AE) on the color image again, and the luminance of the color image is adjusted.

10. An image processing method, comprising:
  obtaining a reference area from a grayscale image, comprises
    capturing a background grayscale image; and
    comparing the grayscale image to the background grayscale image, and the reference area being obtained;
  calculating a luminance value according to a color image and the reference area;
  adjusting luminance of the color image according to the luminance value;
  in response to the luminance value being less than a preset luminance, adjusting the luminance of the color image to the preset luminance; and
  outputting the adjusted color image.

11. The image processing method according to claim 10, wherein comparing the grayscale image to the background grayscale image to obtain the reference area comprises:
  removing the background grayscale image from the grayscale image, and the reference area being obtained.

12. The image processing method according to claim 10, wherein the reference area is an area of a human image.

13. The image processing method according to claim 12, wherein adjusting the luminance of the color image according to the luminance value further comprises:
  in response to the luminance value being greater than the preset luminance, maintaining the luminance of the color image.

14. The image processing method according to claim 10, wherein the reference area is an area of a light image, and adjusting the luminance of the color image according to the luminance value comprises:
  in response to the luminance value being greater than or equal to a threshold value, reducing luminance of a pixel position corresponding to the reference area in the color image.

15. The image processing method according to claim 14, wherein adjusting the luminance of the color image according to the luminance value further comprises:
  in response to the luminance value being less than the threshold value, maintaining the luminance of the pixel position corresponding to the reference area in the color image.

16. The image processing method according to claim 14, wherein reducing the luminance of the pixel position corresponding to the reference area in the color image comprises:
  setting the luminance of the pixel position corresponding to the reference area in the color image to a preset light luminance.

17. The image processing method according to claim 14, wherein reducing the luminance of the pixel position corresponding to the reference area in the color image comprises:
  removing the luminance of the pixel position corresponding to the reference area in the color image.

18. The image processing method according to claim 14, wherein adjusting the luminance of the color image according to the luminance value further comprises:
  performing auto-exposure (AE) on the color image again, and the luminance of the color image being adjusted.

* * * * *